United States Patent
Nishida et al.

(10) Patent No.: US 9,802,650 B2
(45) Date of Patent: Oct. 31, 2017

(54) VEHICLE OF MONOCOQUE CONSTRUCTION FORMED FROM THERMOPLASTIC RESIN MEMBERS

(71) Applicant: TEIJIN LIMITED, Osaka-shi, Osaka (JP)

(72) Inventors: Shintaro Nishida, Chiba (JP); Yuka Saito, Chiba (JP); Kunio Iwasaki, Chiba (JP); Shigeru Aoki, Tokyo (JP)

(73) Assignee: TEIJIN LIMITED, Osaka (JP)

( * ) Notice: Subject to any disclaimer, the term of this patent is extended or adjusted under 35 U.S.C. 154(b) by 0 days.

(21) Appl. No.: 14/892,342

(22) PCT Filed: Jun. 11, 2014

(86) PCT No.: PCT/JP2014/065477
§ 371 (c)(1),
(2) Date: Jan. 29, 2016

(87) PCT Pub. No.: WO2014/203782
PCT Pub. Date: Dec. 24, 2014

(65) Prior Publication Data
US 2016/0137229 A1 May 19, 2016

(30) Foreign Application Priority Data

Jun. 21, 2013 (JP) ................................. 2013-130954

(51) Int. Cl.
*B62D 23/00* (2006.01)
*B60K 1/04* (2006.01)
(Continued)

(52) U.S. Cl.
CPC ................ *B62D 23/00* (2013.01); *B60K 1/04* (2013.01); *B62D 21/12* (2013.01); *B62D 25/20* (2013.01);
(Continued)

(58) Field of Classification Search
CPC .............. B60K 1/04; B60K 2001/0438; B60Y 2200/112; B60Y 2306/01; B62D 21/12;
(Continued)

(56) References Cited

U.S. PATENT DOCUMENTS 2,271,310 A * 1/1942 Schafer .................. B62D 23/00
296/204
2,612,964 A 10/1952 Hobbs
(Continued)

FOREIGN PATENT DOCUMENTS

DE 823408 C * 12/1951 ............. B62D 23/00
DE 1430396 A1 * 11/1968 ........... B62D 25/025
(Continued)

OTHER PUBLICATIONS

International Search Report for PCT/JP2014/065477 dated Sep. 16, 2014 [PCT/ISA/210].
(Continued)

*Primary Examiner* — Glenn Dayoan
*Assistant Examiner* — Paul Chenevert
(74) *Attorney, Agent, or Firm* — Sughrue Mion, PLLC

(57) ABSTRACT

This vehicle of monocoque construction is formed by fastening together resin parts which are an upper body integrally made of a transparent thermoplastic resin composition, a lower body integrally made of a thermoplastic resin composition and a floor integrally made of a thermoplastic resin composition, wherein the vehicle is characterized in that the lower body is provided with a flange part rising up from the entire perimeter of the bottom surface and, in the center of the bottom surface, a convex rib part that continues rearward from the front of the vehicle, and the upper body and the floor being fastened to the flange part and the convex rib part of the lower body. In so doing, there can be provided a vehicle which is lightweight, affords a good field of view (Continued)

during driving, is simple in construction, and has the necessary rigidity.

13 Claims, 16 Drawing Sheets

(51) Int. Cl.
  *B62D 21/12* (2006.01)
  *B62D 29/04* (2006.01)
  *B62D 25/20* (2006.01)

(52) U.S. Cl.
  CPC ......... *B62D 29/046* (2013.01); *B62D 29/048* (2013.01); *B60K 2001/0438* (2013.01); *B60Y 2200/112* (2013.01); *B60Y 2306/01* (2013.01)

(58) Field of Classification Search
  CPC ...... B62D 23/00; B62D 25/20; B62D 29/046; B62D 29/048
  See application file for complete search history.

(56) References Cited

U.S. PATENT DOCUMENTS

| | | | | |
|---|---|---|---|---|
| 3,021,172 | A * | 2/1962 | Fiala | B62D 23/00 296/193.01 |
| 3,022,105 | A | 2/1962 | Tjaarda | |
| 3,331,627 | A | 7/1967 | Schröder et al. | |
| 5,129,700 | A * | 7/1992 | Trevisan | B62D 25/025 296/193.03 |
| 5,193,879 | A | 3/1993 | Chen | |
| 5,483,028 | A * | 1/1996 | Holwerda | B60R 13/08 181/207 |
| 5,501,289 | A * | 3/1996 | Nishikawa | B60K 1/04 180/65.1 |
| 5,882,064 | A * | 3/1999 | Emmons | B62D 21/09 280/781 |
| 5,960,901 | A | 10/1999 | Hanagan | |
| 6,883,857 | B2 * | 4/2005 | Steinhauser | B60R 21/13 296/181.2 |
| 7,635,158 | B2 * | 12/2009 | Park | B62D 21/00 296/193.07 |
| 8,690,226 | B2 * | 4/2014 | Ellis | B29C 41/06 296/181.2 |
| 8,857,853 | B2 * | 10/2014 | Lin | B62D 25/2009 280/124.109 |
| 9,440,685 | B2 * | 9/2016 | Suzuki | B60J 5/02 |
| 2006/0055207 | A1 * | 3/2006 | Reinhardt | B62D 25/20 296/193.07 |
| 2012/0068496 | A1 | 3/2012 | Ellis et al. | |
| 2012/0100792 | A1 | 4/2012 | Giddons et al. | |
| 2012/0126580 | A1 | 5/2012 | Gandini | |
| 2015/0251705 | A1 * | 9/2015 | Mildner | B62D 25/20 296/187.08 |
| 2016/0207418 | A1 * | 7/2016 | Bergstrom | B60L 11/1879 |

FOREIGN PATENT DOCUMENTS

| | | | | |
|---|---|---|---|---|
| DE | 2 128 318 | A1 | 12/1972 | |
| DE | 3035333 | A1 * | 5/1982 | ............ B62D 21/12 |
| DE | 10 2005 052 307 | A1 | 5/2007 | |
| DE | 102008003645 | A1 * | 7/2009 | ............ B62D 25/20 |
| FR | 810757 | A * | 3/1937 | ............ B62D 23/00 |
| FR | 1130239 | A * | 2/1957 | ........... B62D 29/046 |
| FR | 2687974 | A1 * | 9/1993 | ............ B62D 21/10 |
| FR | 2 732 301 | A1 | 10/1996 | |
| FR | 2732658 | A3 * | 10/1996 | .............. B60R 5/00 |
| FR | 2833522 | A1 * | 6/2003 | ........ B60B 35/1063 |
| FR | EP 2390166 | A1 * | 11/2011 | ............ B62D 21/10 |
| FR | 3001185 | A1 * | 7/2014 | ............... B60K 1/04 |
| GB | 1059556 | A * | 2/1967 | ........... B62D 29/046 |
| JP | 59-40980 | A | 3/1984 | |
| JP | 61-166776 | A | 7/1986 | |
| JP | 64-32981 | A | 2/1989 | |
| JP | 5-185953 | A | 7/1993 | |
| JP | 6-219336 | A | 8/1994 | |
| JP | 2001-514480 | A | 9/2001 | |
| JP | 3108250 | U | 4/2005 | |
| JP | 2012-66773 | A | 4/2012 | |
| JP | WO 2013153872 | A1 * | 10/2013 | ............ B62D 21/12 |
| WO | 97/15484 | A1 | 5/1997 | |
| WO | 2011010114 | A1 | 1/2011 | |
| WO | 2012/105717 | A1 | 8/2012 | |

OTHER PUBLICATIONS

Communication dated Feb. 17, 2017 from the European Patent Office in counterpart Application No. 14813137.8.
Translation of Written Opinion of the International Searching Authority for International Application No. PCT/JP2014/065477, dated Sep. 16, 2014, 3 pages.

* cited by examiner

VEHICLE OF MONOCOQUE CONSTRUCTION FORMED FROM THERMOPLASTIC RESIN MEMBERS

CROSS REFERENCE TO RELATED APPLICATIONS

This application is a National Stage of International Application No. PCT/JP 2014/065477 filed Jun. 11, 2014 (claiming priority based on Japanese Patent Application No. 2013-130954, filed Jun. 21, 2013), the contents of which are incorporated herein by reference in their entirety.

TECHNICAL FIELD

The present invention relates to a vehicle body of monocoque construction formed by fastening transparent resin parts of integrally molded articles obtained by molding transparent thermoplastic resin composition. The vehicle body is light-weight, affords a whole field of view during driving, is simple in production, and has rigidity required as a vehicle body. The vehicle body structure of the present invention is especially suitable for a vehicle body of one- or two-seated micro compact electric vehicles.

BACKGROUND ART

So called micro compact mobility such as a micro compact electric vehicle has been developed and spread in recent years. This is because that energy saving and $CO_2$ reduction have been demanded, and in a situation that aging, depopulation and abandonment of public transportation in local areas have been progressing, the micro compact mobility is expected to be a new means of transportation because it can be activated by small power, is easy to be driven by an elderly person and can be provided at a low price. For example, as such micro compact mobility, a one-seated micro compact electric vehicle "Coms" is sold by Toyota Auto Body Co., Ltd.

The present invention provides a vehicle body particularly suitable for micro compact mobility such as a micro compact electric vehicle, being lightweight, having a good field of view during driving, is simple in production, and has rigidity required as a vehicle body.

Synthetic resin has been conventionally used for a vehicle body having a lighter weight, as shown in Japanese Patents JP-A-61-166776, JP-A-5-185953, and JP-A- 59-40980.

Japanese Patent JP-A-61-166776 discloses integrally molding a lower half part of a vehicle body by press molding of a metal plate such as a steel plate or a fiber-reinforced synthetic resin material such as FRP for a one- or two-seated compact vehicle body.

Japanese Patent JP-A-5-185953 discloses a vehicle body assembly for use in small vehicles, such as lawn and garden tractors formed by connecting a thin-walled upper member made of plastic which provides a high gloss surface and a lower member made of fiber reinforced plastic, wherein at least three multi-sided closed sectioned compartments are formed by the upper and lower members in order to improve hardness or rigidity of the assembly.

Japanese Patent JP-A-59-40980 discloses a vehicle body in which all of numerous main parts such as a lower body, a side member, a lower body, an inner, an upper body outer, a hood, a front bumper, a rear bumper and a roof are made of synthetic resin, wherein high rigidity of the vehicle body can be maintained by forming a reinforced part which has a substantially box shape cross-section, and is open downward so as to surround a whole outer periphery of the lower body, and forming a bulge part passing a front and rear direction in a center part of the lower body.

Synthetic resin has lower rigidity than a steel plate. When synthetic resin is used for a structural member such as a lower body, problems occur such that rigidity of a vehicle body tends to be lower, control property changes by deformation of the vehicle body while driving, and control stability worsens.

For the above reason, in Japanese Patents JP-A-61-166776 and JP-A-5-185953, a lower body (lower half vehicle body, lower member) is made of fiber reinforced plastic such as FRP, which requires time and labor to form the lower body. Further, in Japanese Patent JP-A-59-40980, a lower body is made of synthetic resin similar to be used in numerous main parts such as a side member, an upper body inner and an upper body outer. However, the number of the parts constituting the vehicle body is large, time and labor are required to form and assemble the parts. In addition, the document does not disclose any means to secure a space capable of mounting a battery and fix the battery to 5 be mounted in the space.

DISCLOSURE OF THE INVENTION

Problem to be Solved by the Invention

A main object of the present invention is to provide a vehicle body structure which is lightweight, affords a whole field of view during driving, is simple in production, and has rigidity required as a vehicle body.

Further, the vehicle body of the present invention is suitable for a vehicle for one- or two-seated micro compact electric vehicle. Therefore, another object of the invention is to provide a vehicle body structure to which installation, fixing and maintenance of auto parts such as a battery can be performed easily.

Means to Solve the Problem

In order to solve the above problems, the inventors of the present invention have eagerly studied and accomplished the present invention, which is summarized as below.

(1) A vehicle body having monocoque construction formed by fastening together resin parts which are an upper body as an integrally molded article obtained by molding a transparent thermoplastic resin composition, a lower body as an integrally molded article obtained by molding a thermoplastic resin composition and a floor as an integrally molded article obtained by molding a thermoplastic resin composition, wherein the lower body has a bottom surface and a flange part rising up from an entire perimeter of the bottom surface;

in a center of the bottom surface of the lower body, a convex rib part is formed continuously from a front part to a rear part of the vehicle body;

at least two spaces surrounded by the flange part, the convex rib part and the bottom surface are formed in a center part of the lower body of the vehicle to allow auto parts such as a battery to be installed;

the auto parts such as a battery to be installed in the space can be fixed through fastening of the lower body and the floor; and the upper body and the floor are mounted on the lower body, and the upper body and the floor are fastened together to the flange part and the convex rib part of the lower body.

(2) The vehicle body according to (1), wherein a groove is formed on a back surface of the convex rib part, and a plurality of ribs crossing the groove are provided.
(3) The vehicle body according to (1) or (2), wherein the upper body is divided into resin parts which are a front upper body, a rear upper body and a roof.
(4) The vehicle body according to any one of (1) to (3), wherein the transparent thermoplastic resin composition constituting the upper body is a polycarbonate resin composition, and the thermoplastic resin composition constituting the lower body and the floor is polycarbonate resin composition or polyamide resin composition.
(5) The vehicle body according to any one of (1) to (4), wherein the resin parts are formed by heat press molding of a resin plate obtained by the thermoplastic resin composition.
(6) The vehicle body according to any one of (1) to (4), wherein the resin parts are formed by injection molding of the thermoplastic resin composition.
(7) The vehicle body according to any one of (1) to (6), wherein a plurality of independent protrusions are provided on the bottom surface of the lower body, and the fastening of the upper body and the floor to the lower body is performed at the protrusions in addition to the flange part and the convex rib part of the lower body.
(8) The vehicle body according to any one of (1) to (7), wherein an opening forming an entrance is provided on the upper body, and a frame member is provided on an entire perimeter of the formed entrance.
(9) The vehicle body according to (8), wherein a seat belt, a fall prevention member, a rain guard door and the like are attached to the frame member.
(10) The vehicle body according to (8) or (9), wherein a part of the flange part which is positioned in a lower part of the entrance is extended outward, a cross-sectional shape of the extended part is made to a substantial U-shape which extends first downward and then upward, and a tip part of the extended part is connected to the frame member.
(11) The vehicle body according to any one of (1) to (10), wherein a vehicle body of the monocoque construction is egg-shaped.
(12) The vehicle body according to (11), wherein two ridge line parts which are symmetrical with respect to a center line of the vehicle body in a front and rear direction and substantially parallel to the center line are provided on at least an upper surface of the upper body.
(13) The vehicle body according to (12), wherein curvature of the ridge line part is smaller than curvature of any part of the upper body, and the curvature radius is 5 mm or more.
(14) The vehicle body according to any one of (1) to (13), wherein the vehicle body is a vehicle body of a micro compact electric vehicle.

Effects of the Invention

Since the vehicle body of the present invention is formed of resin parts, it can be lighter than a vehicle body using a metal or a fiber reinforced synthetic resin material such as FRP. Particularly, it is suitable for a vehicle body of micro compact mobility such as a micro compact electric vehicle which is driven by a small power.

Further, since the upper body of the vehicle body of the present invention is formed using transparent thermoplastic resin composition, an entire field of view during driving can be secured. In particular, the upper body including a front upper body and a rear upper body is transparent. Therefore, visibility is improved for someone such as a small child and a small animal in very close low distance, a position or a turning angle of wheels can be checked not to go off the shoulder, rearward visibility is also improved, and safety is enhanced. Accordingly, it can be safely driven even by an elderly person.

In addition, the vehicle body of the present invention is formed by integrally molding each of an upper body (the upper body can also be divided into plural parts such as a front upper body, a rear upper body and a roof), a floor and a lower body with thermoplastic resin composition, and thereafter fastening them. Therefore, it can be produced easily, and a vehicle using the vehicle body can be provided at a low price. Particularly, in order to spread micro compact mobility such as a micro compact electric vehicle, it needs to be provided at a low cost. Accordingly, it is a large advantage that the vehicle body can be produced easily.

Further, rigidity of the vehicle body of the present invention is enhanced by a flange part and a convex rib part provided in the lower body, and the upper body (the front upper body and the rear upper body in a case the upper body is divided into the front upper body, the rear upper body and the roof) and the floor are fastened to the lower body at the flange part and the convex rib part. Accordingly, rigidity of the vehicle body, particularly required for micro compact mobility such as a micro compact electric vehicle can be secured.

The vehicle body of the present invention also includes at least two spaces surrounded by the flange part, the convex rib part and the bottom surface which allows auto parts such as a battery to be installed in the vehicle center part of the lower body, and the auto parts such as a battery to be installed in the space is fixed through fastening of the lower body and the floor. Therefore installation, fixing and maintenance of the auto parts such as a battery can be performed easily.

MODE FOR CARRYING OUT THE INVENTION

The present invention relates to a vehicle body having monocoque construction formed by fastening together resin parts which are an upper body as an integrally molded article obtained by molding a transparent thermoplastic resin composition, a lower body as an integrally molded article obtained by a molding thermoplastic resin composition and a floor as an integrally molded article obtained by molding a thermoplastic resin composition, wherein the lower body has a bottom surface and a flange part rising up from an entire perimeter of the bottom surface;

in a center of the bottom surface of the lower body, a convex rib part is formed continuously from a front part to a rear part of the vehicle body;

at least two spaces surrounded by the flange part, the convex rib part and the bottom surface are formed in a center part of the lower body of the vehicle to allow auto parts such as a battery to be installed;

the auto parts such as a battery to be installed in the space can be fixed through fastening of the lower body and the floor; and the upper body and the floor are mounted on the lower body, and the upper body and the floor are fastened together to the flange part and the convex rib part of the lower body.

Embodiments of the present invention are described below showing specific examples with drawings, but the present invention is not limited thereto.

Figure 1:
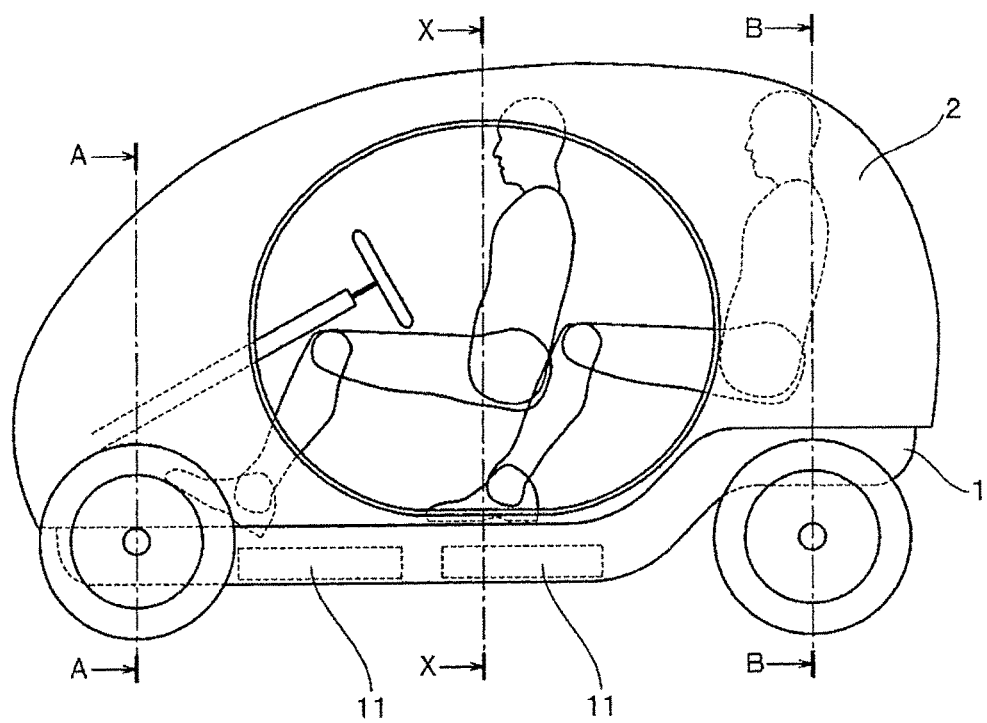
FIG. 1 is a side view of a vehicle which is an example of the present invention.
Figure 2:
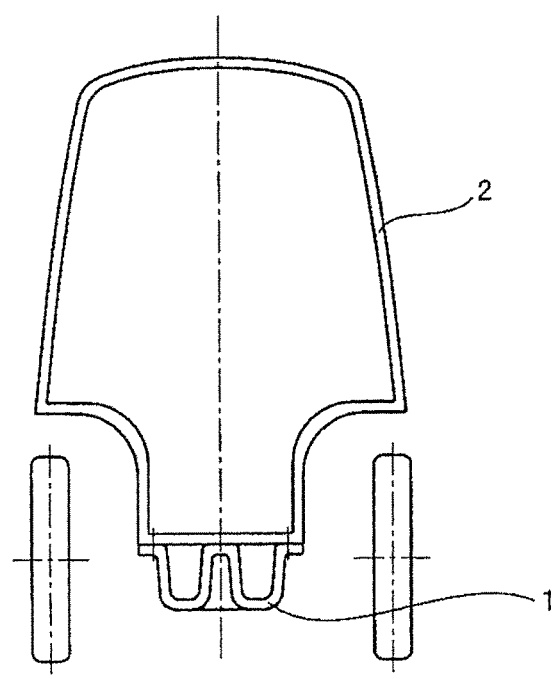
FIG. 2 is an A-A cross-sectional view of FIG. 1 (cross-sectional view at a center of front axle)
Figure 3:
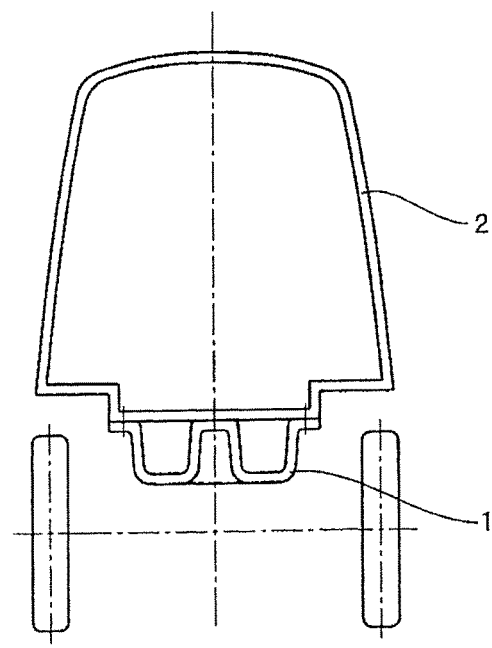
FIG. 3 is a B-B cross-sectional view of FIG. 1 (cross-sectional view at a center of rear axle)
Figure 4:
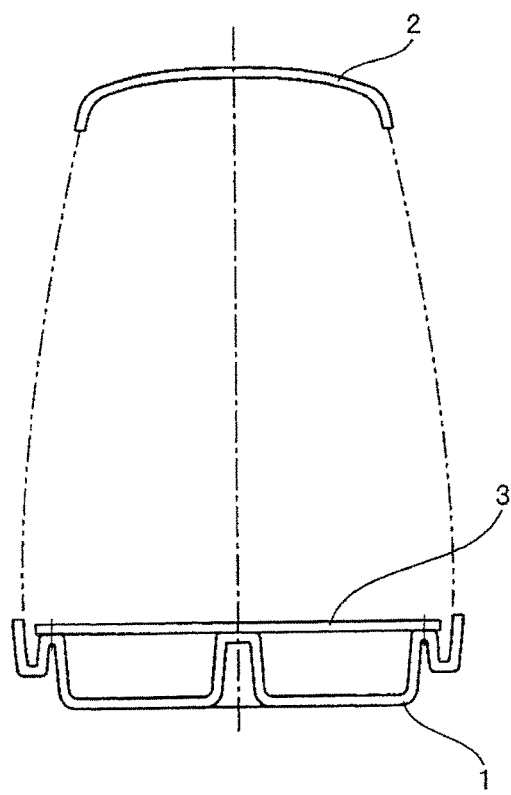
FIG. 4 is an X-X cross-sectional view of FIG. 1 (cross-sectional view at a center of the vehicle body)

FIGS. 1 to 4 show a micro compact vehicle to which the vehicle body of the present invention is mounted. FIG. 1 is a side view, FIG. 2 is an A-A cross-sectional view of FIG. 1 (cross-section at a center of front axle), FIG. 3 is a B-B cross-sectional view of FIG. 1 (cross-section at a center of rear axle) and FIG. 4 is an X-X cross-sectional view of FIG. 1 (cross-section at a center part of the vehicle body). Please note that FIGS. 1 to 4 show the vehicle body structure focusing on the lower body 1, the upper body 2 and the floor 3, whereas an axle and a suspension sub-frame are not shown in the drawings.

Dashed line squares in FIG. 1 show a cross-section of auto parts 11 such as a battery installed on a center part of the vehicle body in the lower body.

Figure 5:
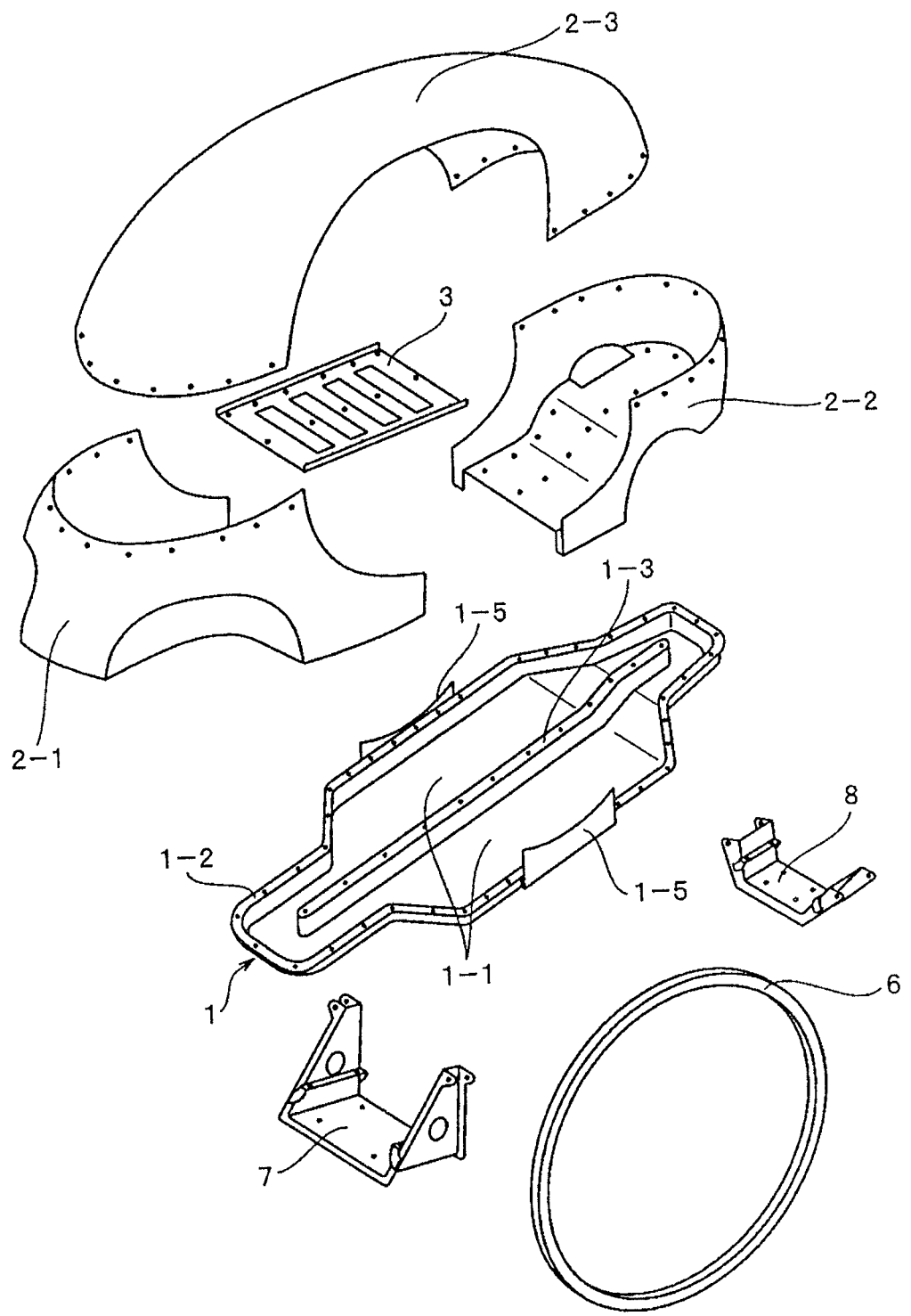
FIG. 5 is a perspective view showing the vehicle body of FIG. 1 separating to roof, front upper body, rear upper body, lower body, floor, front sub-frame, rear sub-frame and frame member.

FIG. 5 shows an example of the vehicle body of the present invention.

The vehicle body having a monocoque construction of the present invention is basically formed by fastening a lower body 1 which is an integrally molded article obtained by molding thermoplastic resin composition, an upper body 2 (a front upper body 2-1, a rear upper body 2-2 and a roof 2-3) which is an integrally molded article obtained by molding a transparent thermoplastic resin composition and a floor 3 which is an integrally molded article obtained by molding a thermoplastic resin composition using a bolt. The upper body 2 may be molded as an integrally molded article or it may be formed by, after molding respective parts such as a front upper body 2-1, a rear upper body 2-2, a roof 2-3 and others as integrally molded articles, fastening them, in consideration of easiness for molding and fastening of the parts.

The term "transparent thermoplastic resin composition" here is used in order to make the upper body 2 (the front upper body 2-1, the rear upper body 2-2 and the roof 2-3) having a good field of view during driving, and the thermoplastic resin composition satisfying a haze of 2 mm thickness of 0.3 to 20%, preferably 0.1 to 1% measured in accordance with JIS K7105 is used.

These resin parts are obtained as an integrally molded article by molding a thermoplastic resin composition. Here, "integrally molded article" means an article using a thermoplastic resin composition as a molding material and molded by a single molding such as heat press molding, injection molding or the like. The integrally molded article does not include a molded article obtained by laminating fabric made from fiber reinforced materials such as a glass fiber and a carbon fiber, or impregnating and shaping resin to the fabric.

As a thermoplastic resin composition constituting the upper body 2, polycarbonate resin composition, acrylic resin composition, cyclic polyolefin resin composition, polyphenylene ether resin composition and the like may be used. Among these, polycarbonate resin composition is preferable because it is excellent in transparency, and also has high impact absorbing property which means improved safety at the time of collision and high impact resistance which is less likely to be damaged at the time of minor collision.

Other thermoplastic resin can be mixed to the polycarbonate resin composition, acrylic resin composition, cyclic polyolefin resin composition, polyphenylene ether resin composition and the like which are used as a main component of transparent thermoplastic resin composition, as long as it is within a range that the target property can be maintained. Further, known additives (an ultraviolet absorber, dye and pigment, a compound having heat-absorbing property, various stabilizers, an antioxidant, a mold release agent, a bluing agent, a hydrolysis improver, a flame retardant, a dropping preventing agent, an antistatic agent and the like) and various fillers can also be mixed.

In order to secure transparency of the upper body 2, it is preferable to prevent additives or fillers which inhibits transparency as little as possible.

As thermoplastic resin composition constituting the lower body 1 and the floor 3, polycarbonate resin composition, polyester resin composition, polyamide resin composition and polyphenylene ether resin composition and the like may be used. However, when the same resin composition is used to the upper body 2, the floor 3 and the lower body 1, resin parts can be molded efficiently and economically. In view of the above, it is preferable to use polycarbonate resin composition.

Other thermoplastic resin compositions can be mixed to the polycarbonate resin composition, polyester resin composition, polyamide polyolefin resin composition, polyphenylene ether resin composition and the like which are used as a main component of the transparent thermoplastic resin composition, as long as it is within a range that the target property can be maintained. Further, known additives (an ultraviolet absorber, dye and pigment, a compound having heat-absorbing property, various stabilizers, an antioxidant, a mold release agent, a bluing agent, a hydrolysis improver, a flame retardant, a dropping preventing agent, an antistatic agent and the like) and various fillers can also be mixed.

Particularly, it is preferable to add short fibers such as a carbon fiber and a glass fiber as a filler to the thermoplastic resin composition in order to improve rigidity of the lower body 1.

As a polycarbonate resin in polycarbonate resin composition used for molding resin parts such as the upper body 2, the floor 3 and the lower body 1, it is preferable to employ bisphenol A polycarbonate because it is excellent in toughness.

Except bisphenol A polycarbonate, various polycarbonate resin polymerized with other dihydric phenol can be used as the polycarbonate resin. Examples thereof include 2,2-bis (4-hydroxy-3-methylphenyl)propane (bisphenol C), 1,1-bis (3-methyl-4-hydroxyphenyl)cyclohexane. Other than dihydric phenol, it may be polycarbonate or copolymerized polycarbonate obtained by polymerizing or copolymerizing bivalent aliphatic or alicyclic alcohol. As alicyclic alcohol, isosorbide (plant-derived) is preferably used.

Viscosity-average molecular weight of the polycarbonate resin is preferably from 10,000 to 40,000. When viscosity-average molecular weight is 10,000 or more, it is preferable in view of excellent strength, and when viscosity-average molecular weight is 40,000 or less, it is preferable in view of excellent moldability.

The above viscosity-average molecular weight (M) of the polycarbonate resin is calculated by assigning a specific viscosity ($\eta_{SP}$) calculated from a solution in which 0.7 g of polycarbonate resin is dissolved in 100 mL of methylene chloride at 20 C.° to the below formula:

$$\eta_{SP}/c=[\eta]+0.45\times[\eta]^2 c \qquad \text{[Formula]}$$

In the above formula, [η] represents limiting viscosity, [η]=$1.23\times10^{-4}M^{0.83}$, and c=0.7.

Such a method to calculate viscosity-average molecular weight of polycarbonate resin is disclosed, for example, in JP-A-2002-129003 publication, paragraphs [0033] to [0034].

Polycarbonate resin obtained by copolymerizing isosorbide is polycarbonate resin containing carbonate building block represented by the below formula (1), and when isosorbide is used, particularly, hardness of resin product can be enhanced, which is preferable. Further, when bisphenol A and isosorbide are used concurrently, it is preferable because hardness of resin parts can be enhanced while impact resistance is maintained.

[Chem. 1]

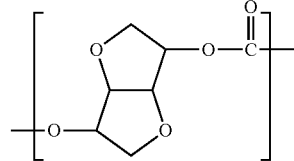

(1)

Further, it is preferable to use aromatic polycarbonate resin and biodegraded resin composition containing polylactate as the polycarbonate resin composition, because hardness of resin parts can be enhanced.

As a method to mold resin parts such as an upper body 2, a floor 3 and a lower body 1 from a thermoplastic resin composition, a method of heat press molding of a resin plate obtained by the resin composition, a method of injection molding of the resin composition and the like can be employed. In a case that transparency of the resin composition is emphasized, the former heat press molding is preferably used, and in a case that molding efficiency is emphasized, the injection molding is preferably used.

Following means are employed in the present invention in order to enhance bending rigidity and torsional rigidity of bodies as well as to secure rigidity required as a vehicle body.

1) A means to provide a flange portion 1-2 in a lower body 1 so that the flange portion rises up from an entire perimeter of a bottom surface 1-1.

2) A means to provide a convex rib part 1-3 that continues from a front part to a rear part of a vehicle in a center of the bottom surface 1-1 in the lower body 1.

3) A means to mount an upper body 2 (a front upper body 2-1 and a rear upper body 2-2 in a case that the upper body 2 is divided into the front upper body 2-1, the rear upper body 2-2 and a roof 2-3) and a floor 3 on the lower body 1, and fasten them to the flange part 1-2 and the convex rib part 1-3 in the lower body 1.

Figure 6:
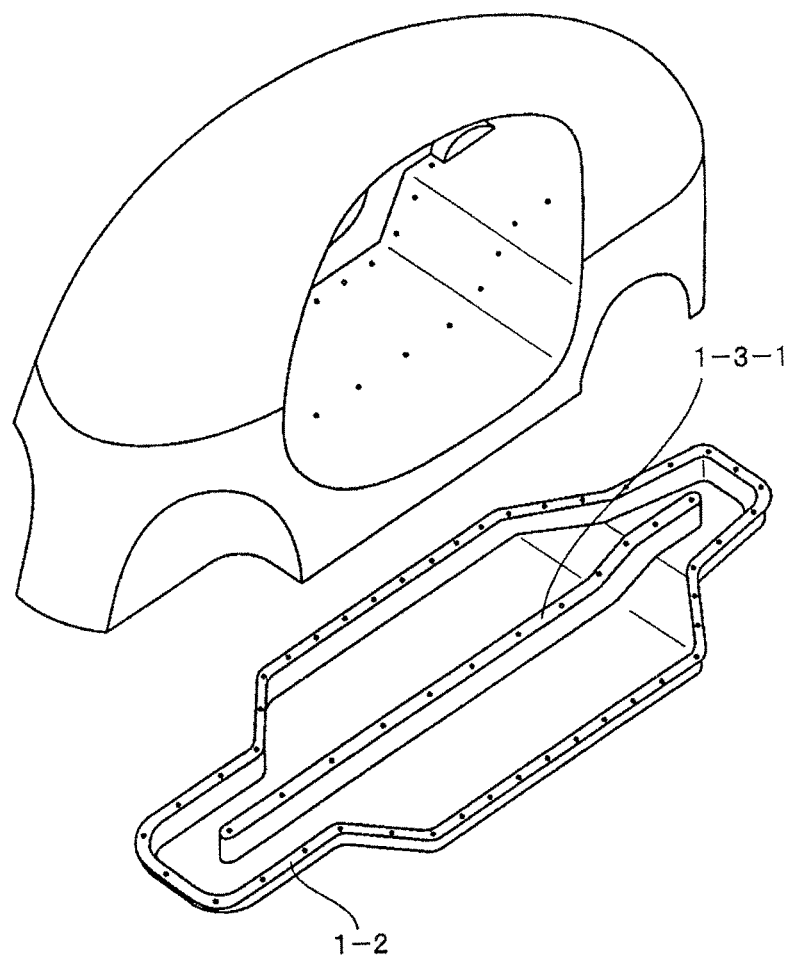
FIG. 6 is a perspective view showing an example of convex rib part in the present invention.
Figure 7:
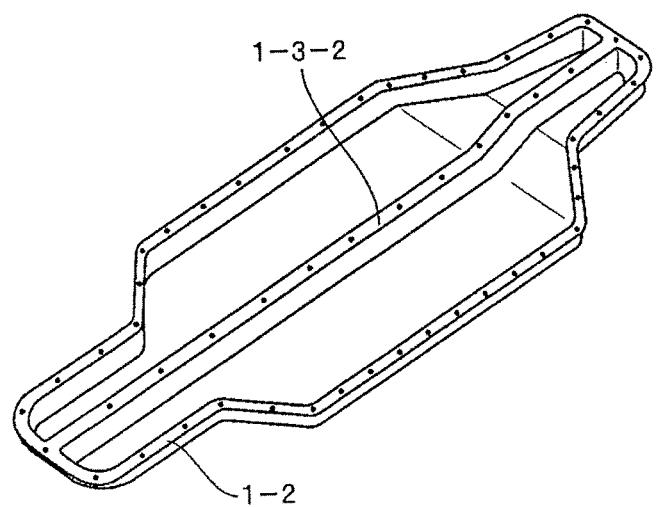
FIG. 7 is a perspective view showing another example of convex rib part in the present invention.

Regarding a shape of the convex rib part 1-3 viewing from a top of the lower body 1, each end of the convex rib part 1-3 and the flange part 1-2 may be separated as shown in 1-3-1 in FIG. 6, or the both ends of the convex rib part 1-3 and the flange part 1-2 may be connected as shown in 1-3-2 in FIG. 7.

Figure 8A:
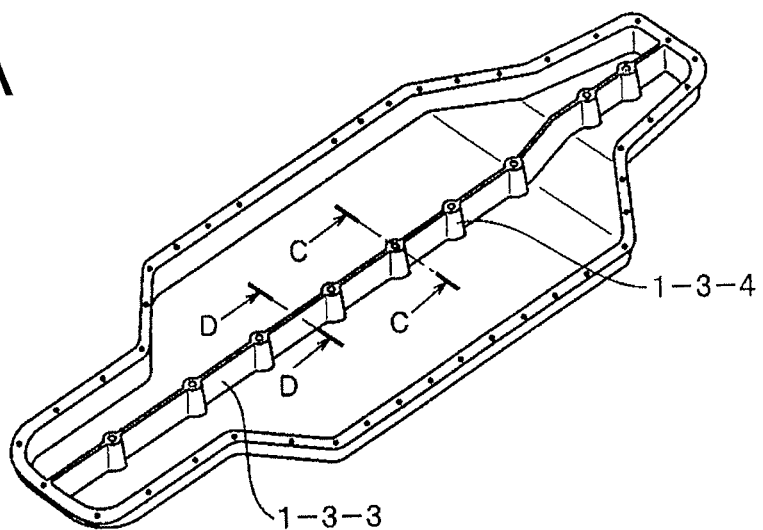
FIG. 8 (a) is a perspective view showing another example of convex rib part in the present invention, (b) is a C-C cross-sectional view of (a), and (c) is a D-D cross-sectional view of (a)
Figure 8B:
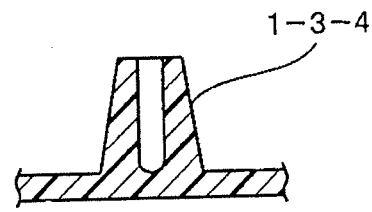
Figure 8C:
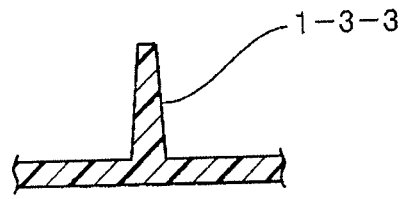

The convex rib part 1-3 in a shape of standing thin plate-like body as a whole, as shown in FIGS. 8(a) and (c), and having a boss part in a substantial frustum of a cone-shape as a part fastened with a bolt and the like to the upper body (the front upper body 2-1 and the rear upper body 2-2 in a case that the upper body 2 is divided into the front upper body 2-1, the rear upper body 2-2 and the roof 2-3) as shown in 1-3-4 in FIGS. 8(a) and (b) may be employed.

Figure 9:
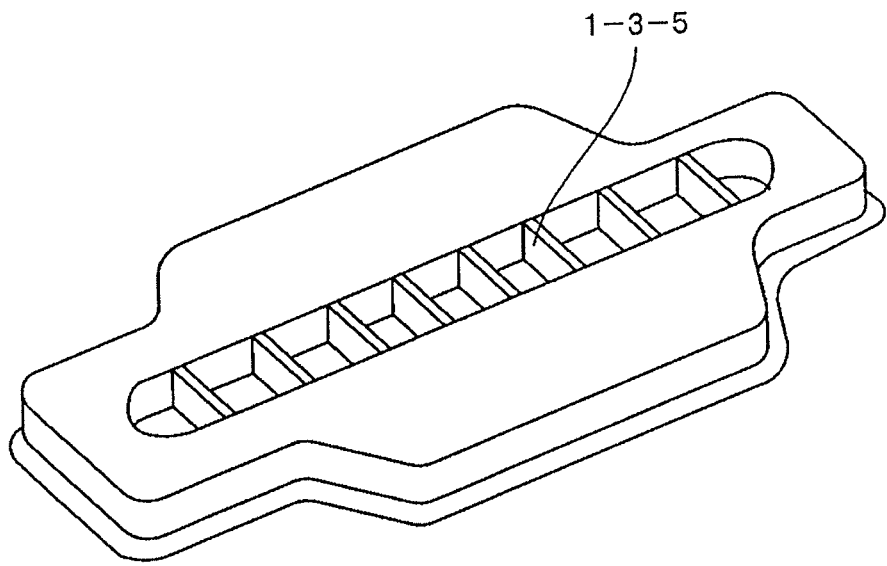
FIG. 9 is a perspective view of convex rib part of FIGS. 6 and 7 viewing from back surface.

Further, as shown in FIG. 9, it is preferable to provide a groove extending in a front and rear direction of the vehicle body on a back surface of the convex rib part 1-3 and a plurality of ribs 1-3-5 crossing the groove. Please note that when the lower body 1 has a constant thickness, a groove extending in a front and rear direction of the vehicle body is formed on the back surface of the convex rib part 1-3 along with formation of the convex rib part 1-3 on the bottom surface 1-1 of the lower body 1.

By providing the ribs 1-3-5 in the groove in this manner, bending rigidity and torsional rigidity of the lower body 1 can be improved whereas weight can be reduced, and bending rigidity and torsional rigidity of the whole vehicle body can be improved. In addition, shape, number and interval of the ribs 1-3-5 can be appropriately determined in view of rigidity. The ribs 1-3-5 can also be installed obliquely or cross-like.

Since parts constituting a vehicle body can be tightly connected by fastening the upper body 2 (the front upper body 2-1 and the rear upper body 2-2 in a case that the upper body 2 is divided into the front upper body 2-1, the rear upper body 2-2 and the roof 2-3) and the floor 3 to the lower body 1 at the flange part 1-2 and the convex rib part 1-3 in the lower body 1, bending rigidity and torsional rigidity of the body can be improved, and thus bending rigidity and torsional rigidity of the whole vehicle body can be improved. In order to tightly joint the parts constituting the vehicle body, it is preferable that the convex rib part 1-3 is integrally molded with the lower body 1, and apexes thereof rise up to the same height as a top surface of the flange part 1-2.

Since auto parts such as a battery, a controller and a charger (also referred to as "battery and the like") are mounted on at least two spaces formed in a center part of the vehicle in the lower body 1 and surrounded by the flange part 1-2, the convex rib part 1-3 and the bottom surface 1-1, the battery and the like are protected by the surrounding resin walls. Further, since the battery and the like are mounted on a low position of the vehicle, the vehicle has a low center of gravity, and since they are mounted on a center in a front and rear direction of the vehicle, occurrence of turning moment can be reduced. Therefore, driving stability of the vehicle can be improved.

In addition, since the battery and the like mounted on the spaces are fixed by fastening the floor 3 to the lower body 1, the mounting, fixing and maintenance of the battery and the like can be easily conducted.

Figure 10:
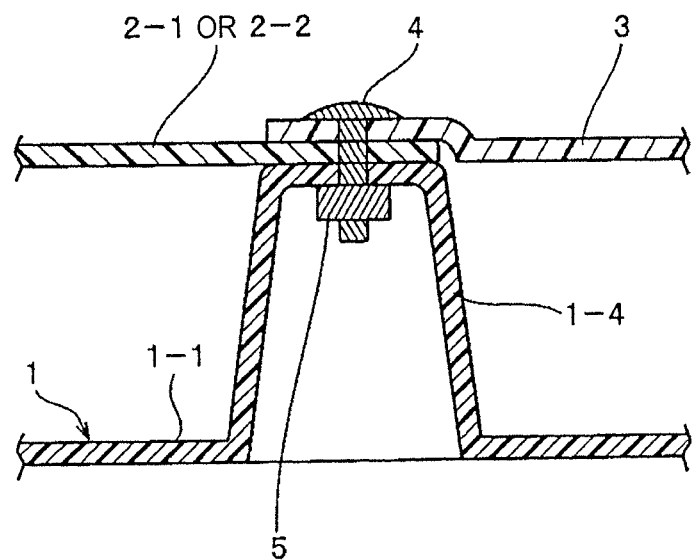
FIG. 10 is a cross-sectional view showing a protrusion having a frustum of a cone-shape in the lower body.
Figure 11:
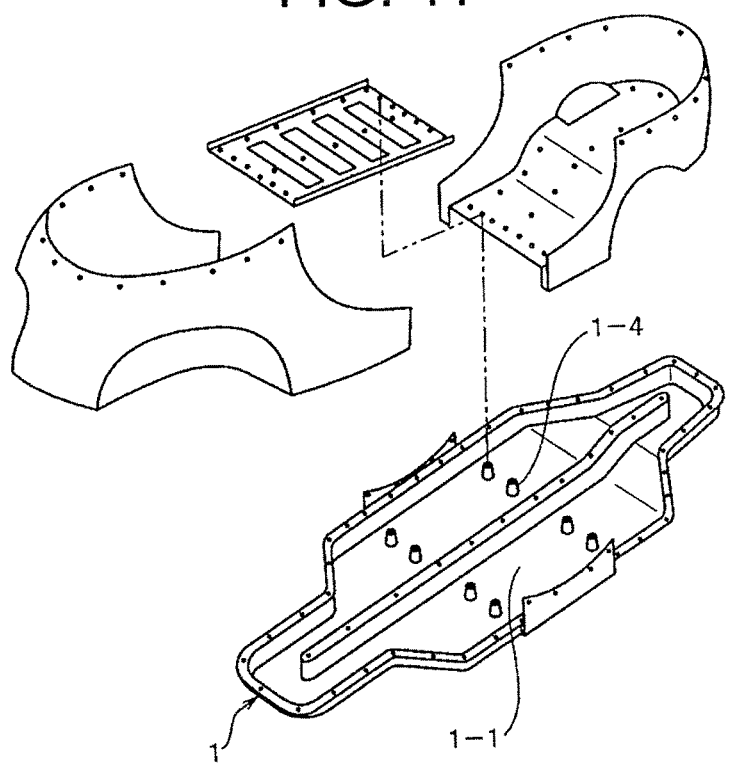
FIG. 11 is a perspective view showing a protrusion having a frustum of a cone-shape in the lower body.

As shown in FIGS. 10 and 11, bending rigidity and torsional rigidity of the body can be further improved by providing a plurality of independent protrusions 1-4 on the bottom surface 1-1 in the lower body 1 and fastening the upper body 2 (the front upper body 2-1 and the rear upper body 2-2) and the floor 3 with the lower body 1 at not only at the flange part 1-2 and the convex rib part 1-3 but also at the protrusions 1-4. Thus, bending rigidity and torsional rigidity of the whole vehicle body can be further improved.

The protrusion 1-4 preferably has a substantial frustum of a cone-shape, as shown in FIG. 10. When the front upper body 2-1 and the floor 3 are overlapped for fastening, apexes of the protrusions 1-4 are also fastened at the same time. It means, the apexes of the protrusions 1-4 which are a part of the lower body 1, the front upper body 2-1 and the floor 3 are fastened simultaneously. 4 is a fastening screw, and 5 is a nut. The fastening part of the rear upper body 2-2 and the floor 3 has the same structure.

As such, bending rigidity and torsional rigidity of whole vehicle body can be further improved by fastening the front upper body 2-1 or the rear upper body 2-2 with the floor 3 at the apexes of the protrusions 1-4. In order to tightly fasten the parts constituting the vehicle body, it is preferable that the protrusions 1-4 are molded integrally with the lower body 1, and the apexes rise up to the same height as a top surface of the flange part 1-2. The protrusions 1-4 are provided to tightly fasten the three parts of the lower body 1, the front upper body 2-1 or the rear upper body 2-2 and the floor 3, and the protrusions 1-4 may be molded integrally with the lower body 1 as shown in FIG. 10, or they may be molded integrally with the front upper body 2-1, the rear upper body 2-2 or the floor 3. Further, the protrusions 1-4 may be different parts which are independent from the lower body 1, the front upper body 2-1, the rear upper body 2-2 and the floor 3, and may have a height equivalent to the protrusions 1-4.

Also, as shown in FIG. 11, a battery and the like can be fixed more stably by placing the protrusions 1-4 in two rows perpendicular to the driving direction, and mounting the battery and the like between the rows.

Figure 12:
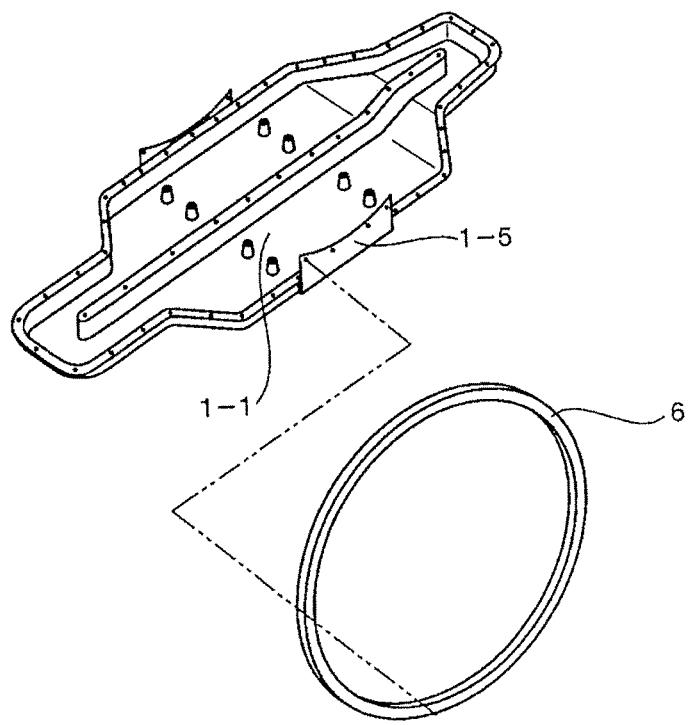
FIG. 12 is a perspective view showing a flange extended part in the lower body.

As shown in FIG. 5, by providing an opening which forms an entrance to the vehicle in the upper body 2 (the front upper body 2-1 and the rear upper body 2-2) and a frame member 6 on an entire perimeter of the formed entrance, as shown in FIGS. 5 and 12, the rigidity of the vehicle is further improved, and the frame member 6 can be used as a member to which a seat belt 6-7, a fall prevention member 6-8 and a rain guard door 6-9 and the like are attached. The frame member 6 is preferably made of aluminum and has a circular shape. It can also serve as a rain gutter of the entrance by making a cross-sectional shape of outer periphery of frame member 6 outward-directed concave shape.

Figure 13:
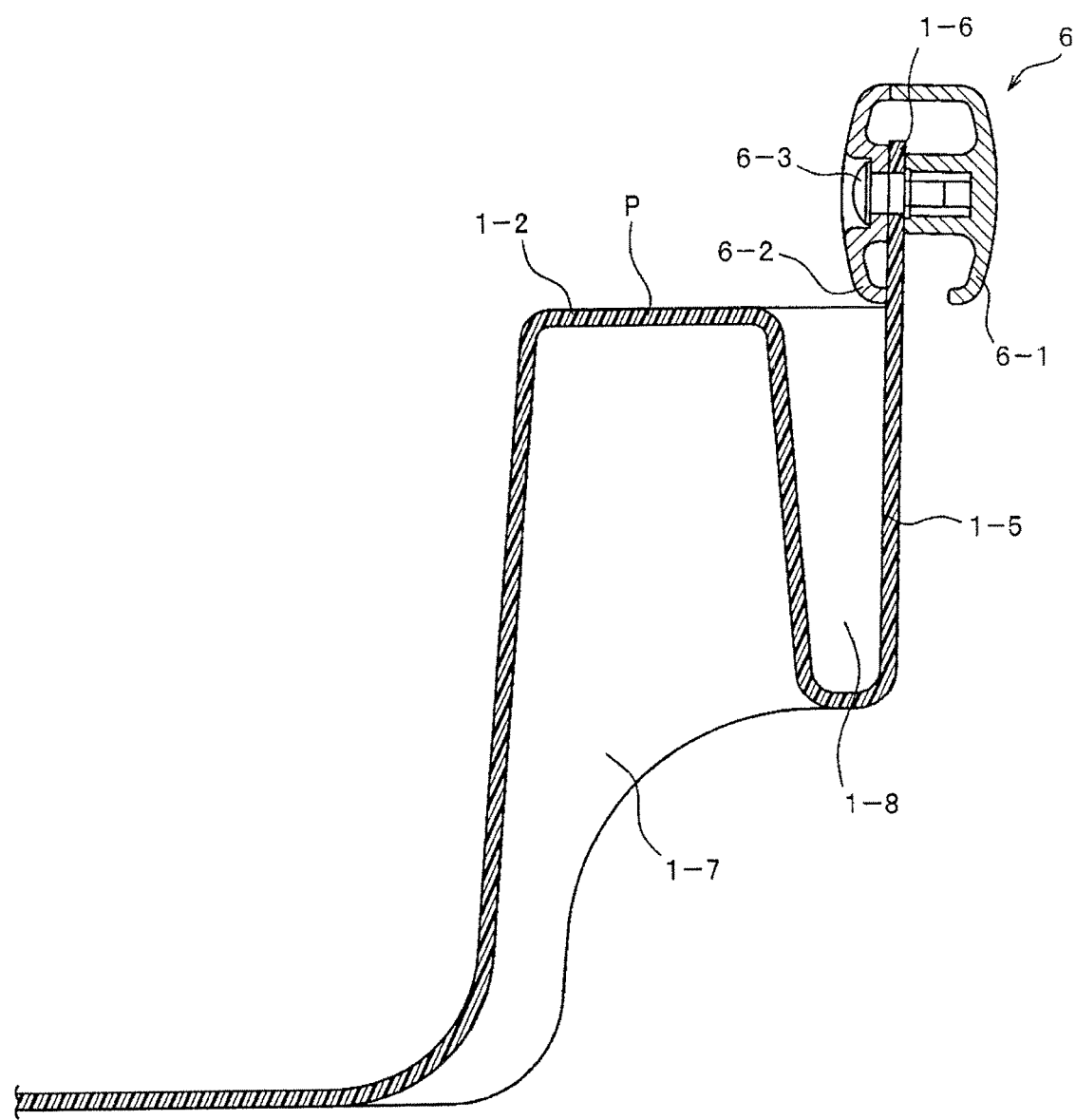
FIG. 13 is a cross-sectional view showing a joint status of the flange extended part and the frame member in the lower body.

As shown in FIG. 13, two of an outer frame member 6-1 and an inner frame member 6-2 made of aluminum are fastened with a fastening screw 6-3 is preferable as the frame member 6.

FIG. 13 shows that a part of the flange part 1-2 positioned in a lower part of the entrance extends outward, a cross-sectional shape of the extended part is a substantial U-shape which extends first downward and then upward, and a tip part of the extended part is jointed to the frame member 6.

Specifically, a regular part of the flange part 1-2 of the lower body 1 ends at point P, but in a lower part of the entrance to vehicle, the flange part 1-2 extends outward to a substantial U-shape part (a side sill part) 1-5 in which a cross-sectional shape of the extended part extends first downward and then upward, as shown in FIG. 13, and a tip part 1-6 of the side sill shape part 1-5 is held between the outer frame member 6-1 and the inner frame member 6-2 made of aluminum and fastened with the fastening screw 6-3. Reinforced ribs 1-7 and 1-8 are provided in a part surrounded by the side sill shape part 1-5, the flange part 1-2 and the side surfaces of the lower body 1 for reinforcement in order to enhance the bindings of a main body of the lower body 1 and the frame member 6.

With the above structure, the lower body 1 is covered by the side sill shape part 1-5 when the vehicle is viewed laterally, which can improve merchantability of the vehicle. Further, since the tip part 1-6 of the extended part of the flange part 1-2 is jointed with the frame member 6, load transmitted from a suspension system to the lower body 1 is transmitted via the frame member 6 to the front upper body 2-1, the rear upper body 2-2 and the roof 2-3, which results in an ideal stress distribution as a monocoque body sharing the load with the whole monocoque construction. The above structure also enables protecting a passenger and a battery against load from a side of the vehicle (e.g. side collision).

Figure 14:
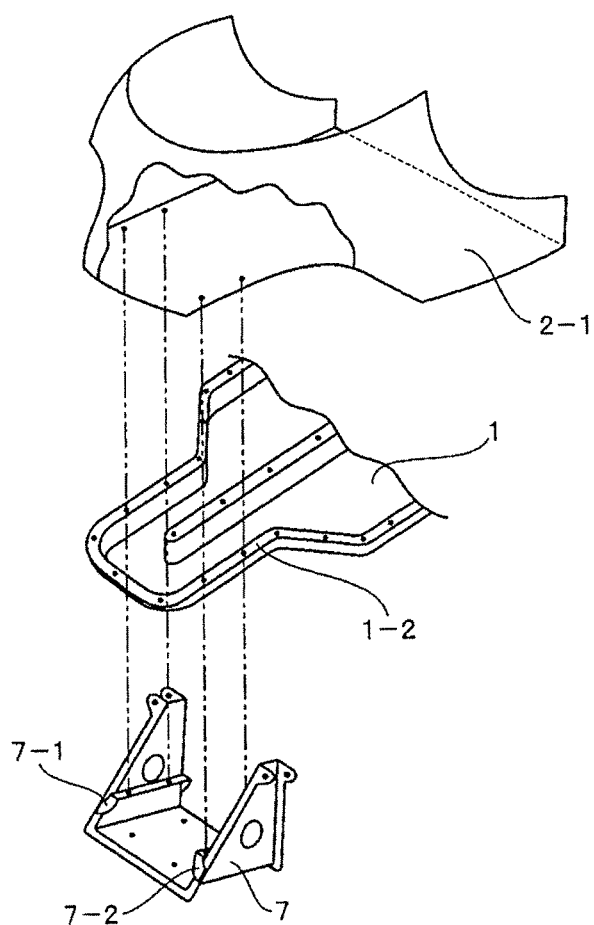
FIG. 14 is a perspective view showing a joint status of the suspension sub-frame with the lower body and the front upper body.

FIG. 14 shows a perspective view showing a fastening structure of a front suspension sub-frame 7, the lower body 1 and the upper body 2-1.

The front suspension sub-frame 7 is a member to which a suspension, a brake, a steering and the like are attached, and these are fastened with the resin monocoque body via the front suspension sub-frame 7. Specifically, the front suspension sub-frame 7 has a structure jointed with brackets 7-1 and 7-2 with welding, and the front suspension sub-frame 7 is fastened at the bottom surface of the lower body 1 and fastened with the flange part 1-2 and the front upper body 2-1 via the brackets 7-1 and 7-2 at the same time. The same goes for fastening of a rear suspension sub-frame 8, the lower body 1 and the rear upper body 2-2.

As such, the front suspension sub-frame 7 is a structure which is contacted with and fixed to a large area of the bottom surface of the lower body 1.

With the above structure, equipment constituting a suspension system of a vehicle such as a tire, a wheel, a suspension, a steering and a brake can be mounted to the vehicle in a state that they are incorporated to the front suspension sub-frame 7. Also, since the front suspension sub-frame 7 is jointed to the flange part 1-2 existing on an entire perimeter of the lower body 1 together with the front upper body 2-1, load of the suspension system is transmitted to the whole vehicle via the flange part 1-2 existing on the entire perimeter of the lower body 1, which enables an ideal load distribution as a monocoque body sharing the load with the whole monocoque construction.

The front suspension sub-frame 7 is preferably contacted with the bottom surface of the lower body 1 without having a locally contacted part. The resin monocoque body does not have enough rigidity for such local load. Therefore, in order to avoid addition of local load and suppress local deformation of the resin body, the front suspension sub-frame 7 needs to uniformly contact with the bottom surface of the resin monocoque body not to have a local contact.

Figure 15:
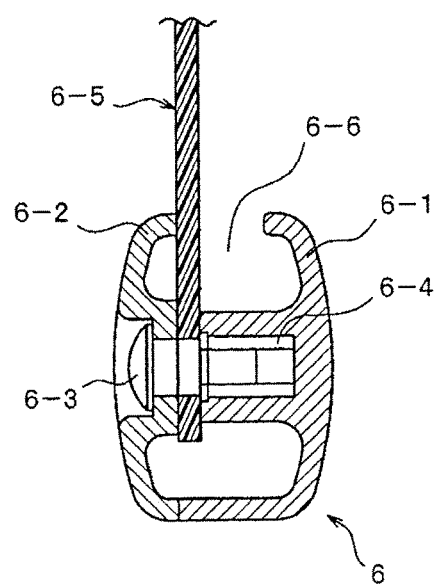
FIG. 15 is a cross-sectional view of a frame member provided in opening.

FIG. 15 shows a cross-sectional view of the frame member 6 installed in an entrance part to a vehicle. 6-1, 6-2, 6-3 and 6-4 show the outer frame member, the inner frame member, the fastening screw and an insertion nut, respectively. 6-5 is the front upper body 2-1, the rear upper body 2-2 or the roof 2-3, and 6-6 is a part functioning as a rain gutter.

Figure 16:
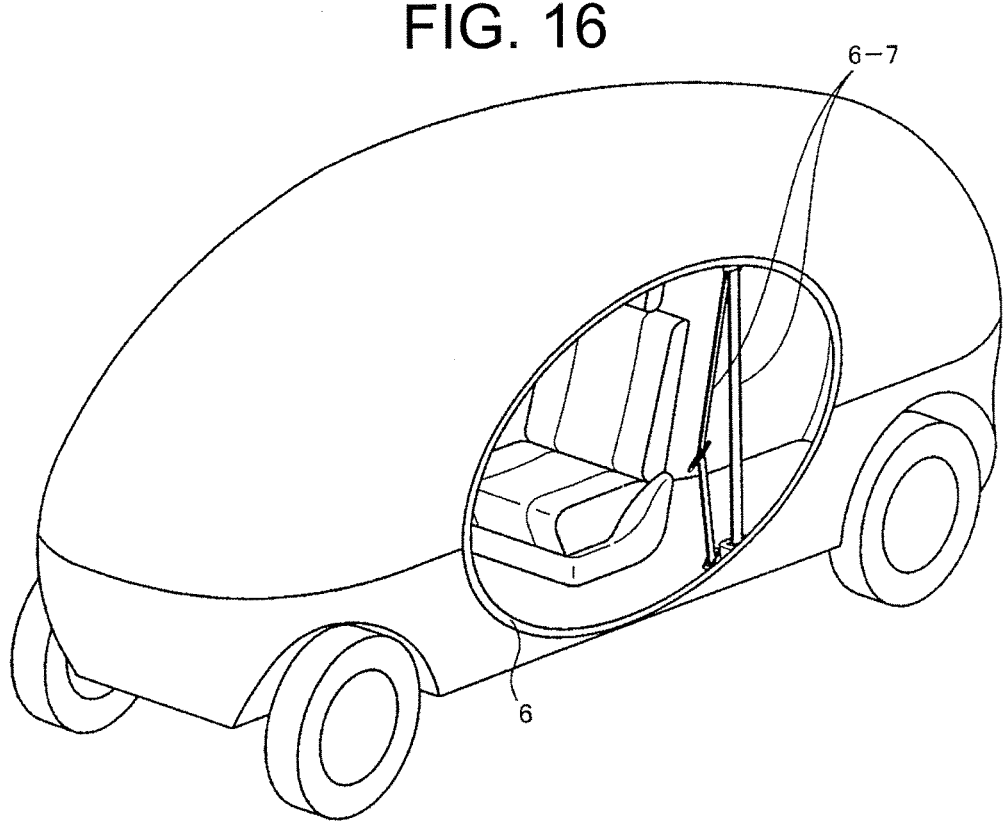
FIG. 16 is a cross-sectional view showing an example in which the frame member is used as an attachment member for a seat belt.
Figure 17:
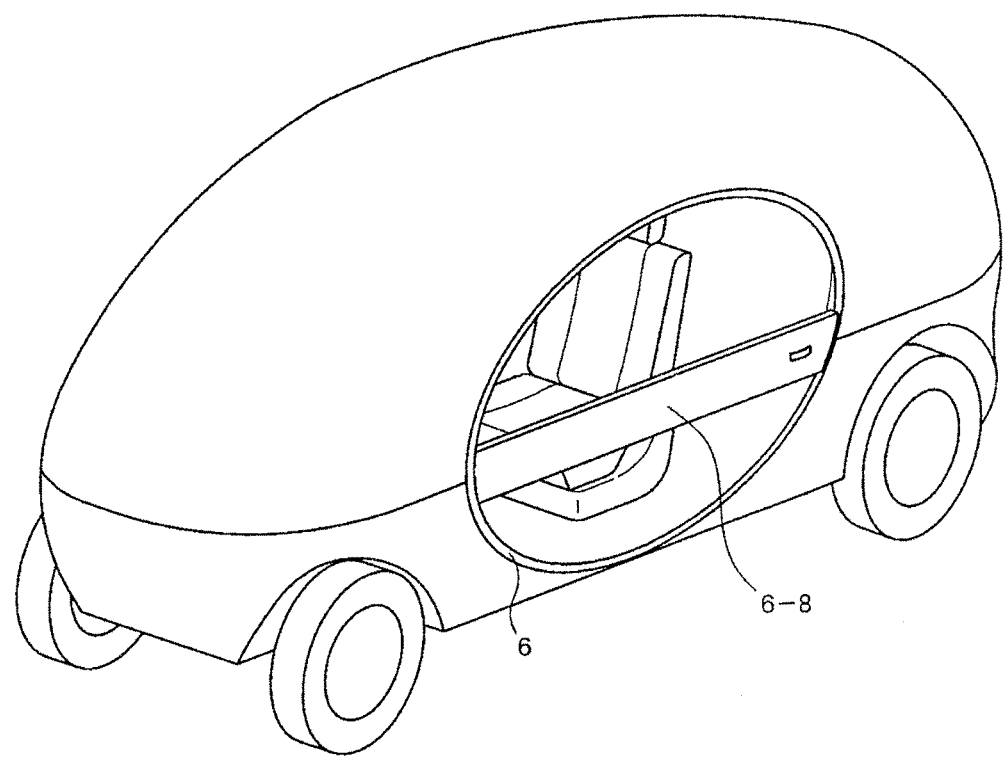
FIG. 17 is a perspective view showing an example in which the frame member is used as an attachment member for a fall prevention member.
Figure 18:
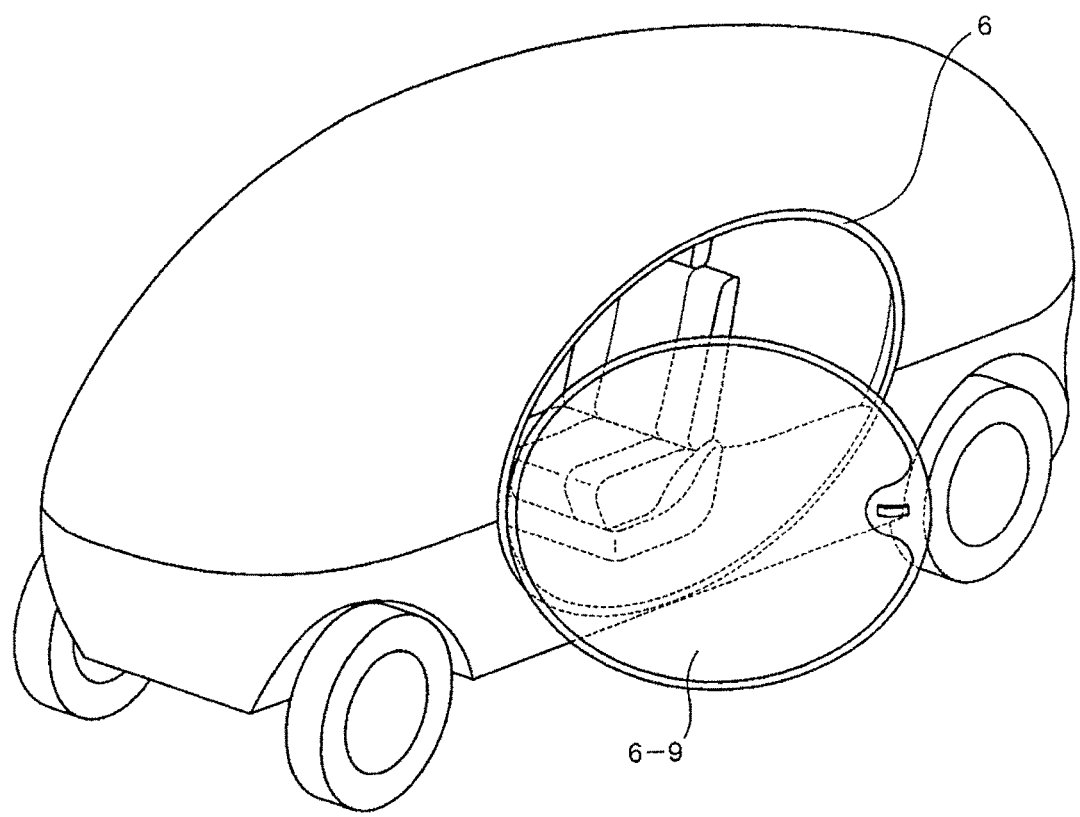
FIG. 18 is a perspective view showing an example in which the frame member is used as an attachment member for a rain guard door.

FIG. 16 shows an example in which the frame member 6 is used as an attaching member of a seat belt 6-7. FIG. 17 shows an example in which the frame member 6 is used as an attachment member of a fall prevention member 6-8. FIG. 18 shows an example in which the frame member 6 is used as an attachment member of a rain guard door 6-9.

As a shape of a vehicle body of the monocoque construction of the present invention, an egg shape as shown in FIGS. 5, 6 and 16 to 18 are generally adopted. As a reason therefor, a resin material has a smaller allowable stress compared with metal, and an egg shape is generally preferable because it has no corner part to which a stress tends to concentrate, and it can secure a space for passengers.

Figure 19:
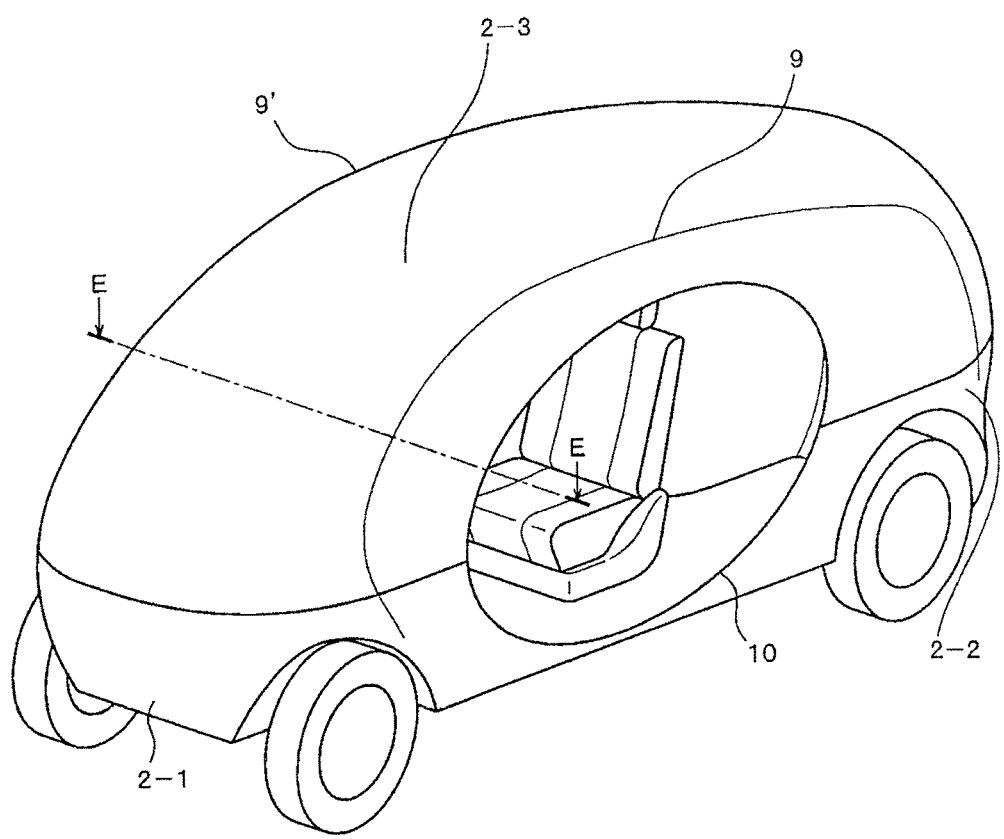
FIG. 19 is a perspective view showing an example of the vehicle body of the present invention.

However, as shown in FIG. 19, an opening 10 to form an entrance to vehicle is usually provided on a side surface of the upper body 2 (the front upper body 2-1, the rear upper body 2-2 and the roof 2-3), and a cross-sectional area of the upper body 2 in a lateral direction of the vehicle becomes small. Therefore, in order to improve a rigidity of the part, it is preferable to provide two ridge line parts 9 and 9' which are symmetrical with respect to a center line of the vehicle in a front and rear direction and run substantially parallel to the center line on at least an upper surface of upper body 2.

The ridge line parts 9 and 9' may be provided from a front surface to a rear surface of the upper body 2. However, it needs to be provided on at least the upper surface of the upper body 2 in order to improve rigidity around the opening part 10.

Figure 20:
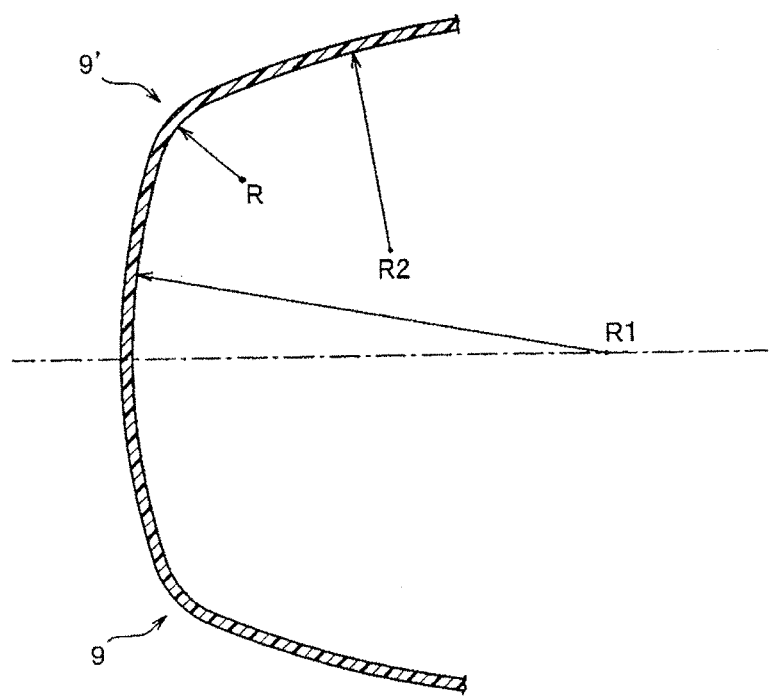
FIG. 20 is an E-E cross-sectional view of FIG. 19.

Further, as shown in FIG. 20, curvature R of the ridge line parts 9 and 9' are preferably smaller than curvature of any parts in the upper body 2 (R1 is curvature of a front area and R2 is curvature of a side area) and has a curvature radius of 5 mm or more. When the curvature radius of the ridge line parts 9 and 9' is less than 5 mm, a corner part formed by the ridge line parts 9 and 9' has a sharp angle, which is not preferable because safety is deteriorated in a case of a collision with a pedestrian. (All cross-sections of bending shapes from a front surface, an upper surface to a rear surface of the vehicle also conform to the cross-section E-E in FIG. 20.)

The vehicle body of the monocoque construction having higher rigidity can be obtained by providing the ridge line parts 9 and 9' compared with an egg shaped monocoque construction without a ridge line part, as shown in FIGS. 5, 6 and 16 to 18.

Figure 21:
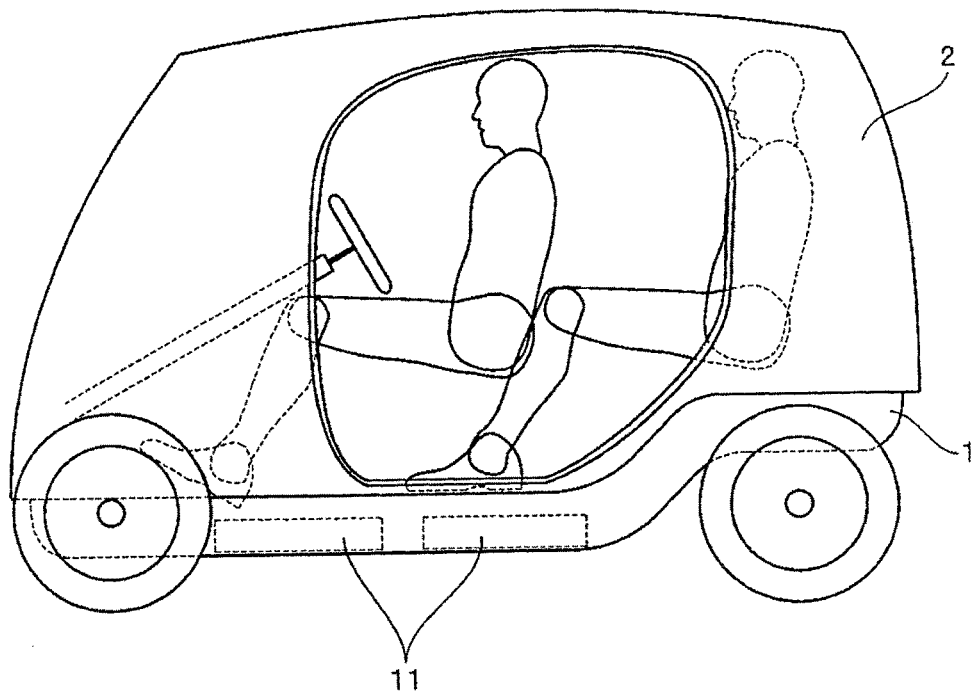
FIG. 21 is a side view showing an example of a shape of the vehicle body (van type shape)
Figure 22:
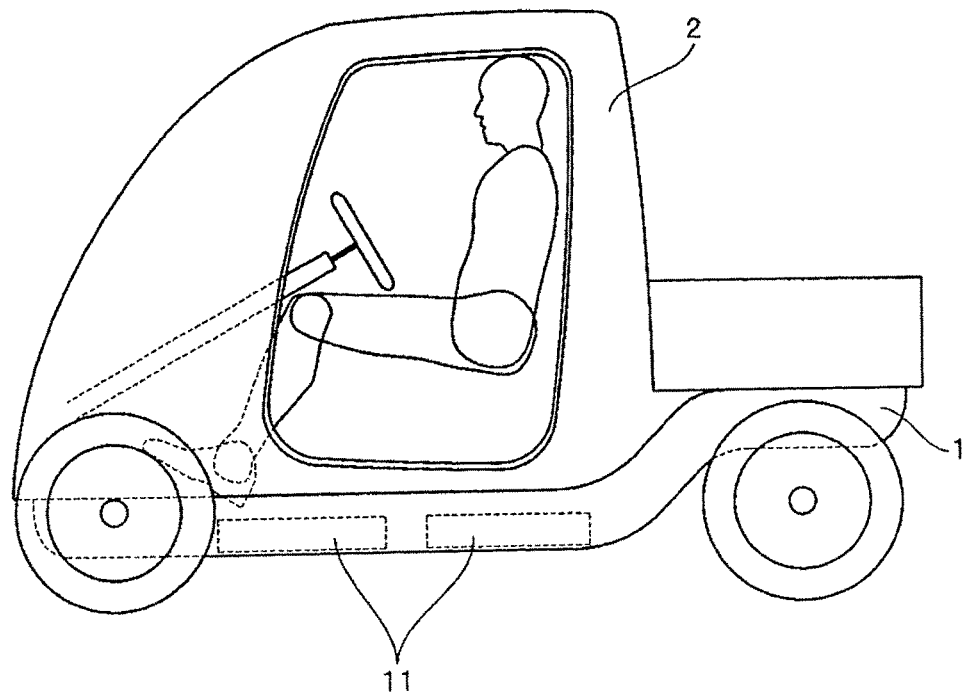
FIG. 22 is a side view showing another example of a shape of the vehicle body (truck type shape)
Figure 23:
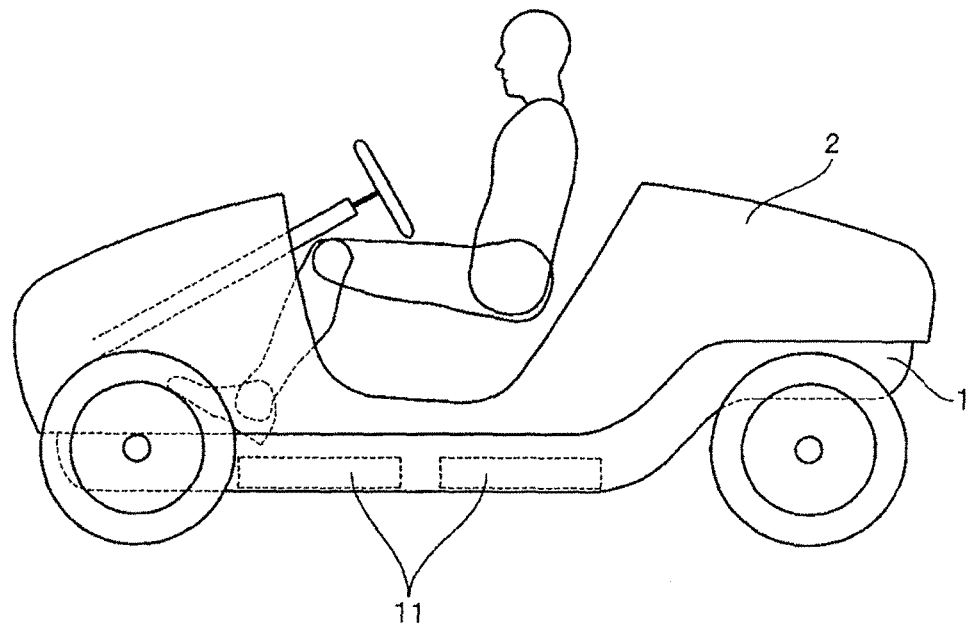
FIG. 23 is a side view showing another example of a shape of the vehicle body (convertible type shape)

As a shape of the vehicle of the present invention, a van-type shape as in FIG. 21, a truck-type shape as in FIG. 22 and a convertible-type shape as in FIG. 23 can be employed.

<Calculation of Bending Rigidity and Torsional Rigidity of a Vehicle Body (Simulation)>

Bending rigidity and torsional rigidity of a vehicle body is calculated using "I-DEAS 12 NX" manufactured by UGS Corp. as a pre-processor and "ADINA 8.5" manufactured by ADINA R&D, Inc. as a solver under conditions as below.

Resin:

Panlite (registered trademark) L-1250Z (polycarbonate resin manufactured by Teijin Limited, molecular weight: approximately 25,000, MFR: approximately 5.5)

Dimension of Thickness:

Thickness of the upper body 2 (the front upper body 2-1, the rear upper body 2-2 and the roof 2-3), the floor 3 and the lower body are set at 3 mm.

Figure 24:
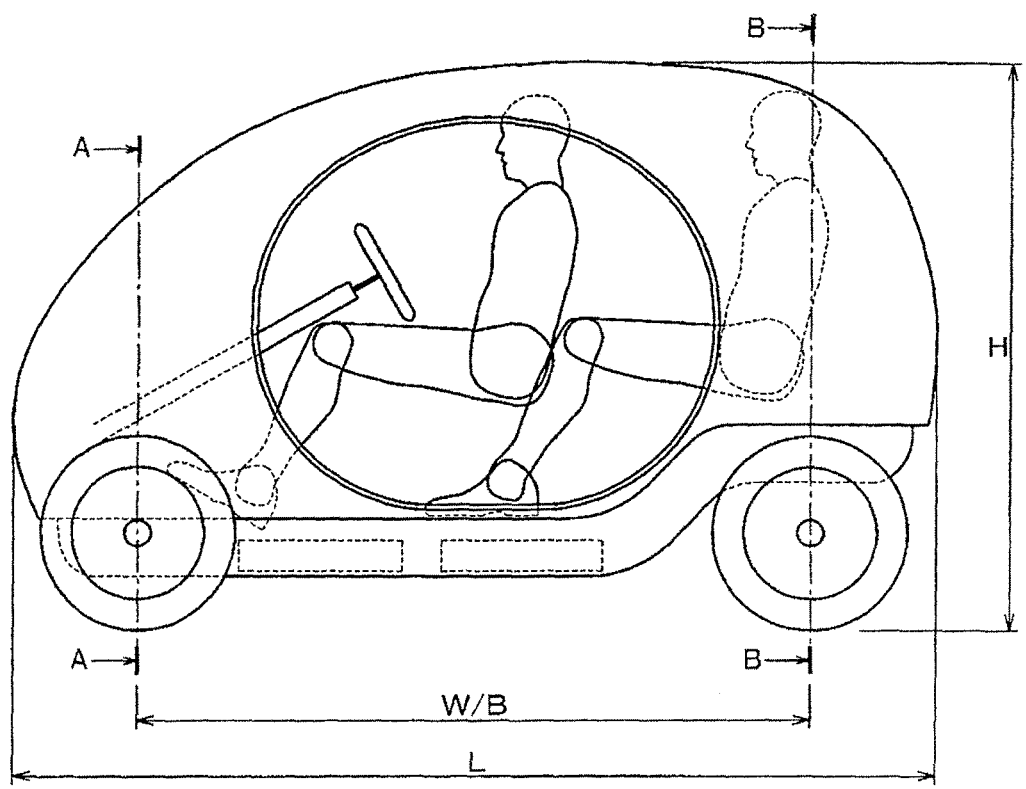
FIG. 24 is a drawing in which dimensional positions are shown in FIG. 1 for indicating figures used in a simulation.
Figure 25:
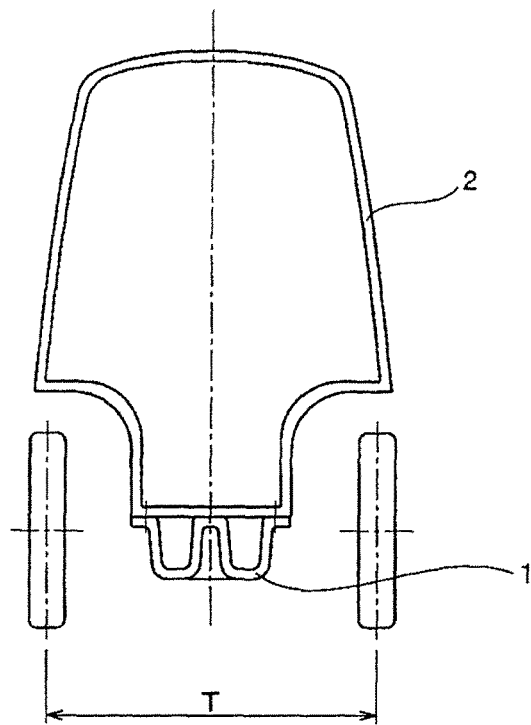
FIG. 25 is a drawing in which dimensional positions are shown in FIG. 2 for indicating figures used in the simulation.
Figure 26:
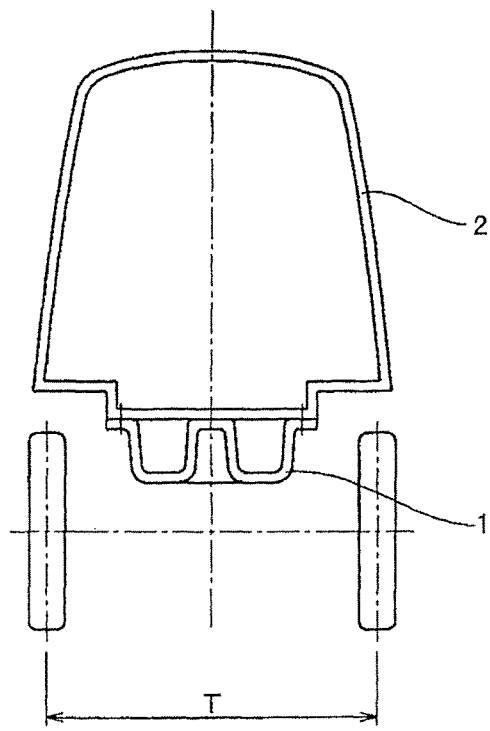
FIG. 26 is a drawing in which dimensional positions are shown in FIG. 3 for indicating figures used in the simulation.

Dimension of Vehicle Body:

As shown in FIG. 24, a vehicle height (H), an entire length (L) and a wheelbase (W/B) are set at 1,554 mm, 2,485 mm and 1,815 mm, respectively. Further, as shown in FIGS. 25 and 26, a tread (T) in A-A cross-section and B-B cross-section in FIG. 24 are set at 890 mm.

Figure 27A:
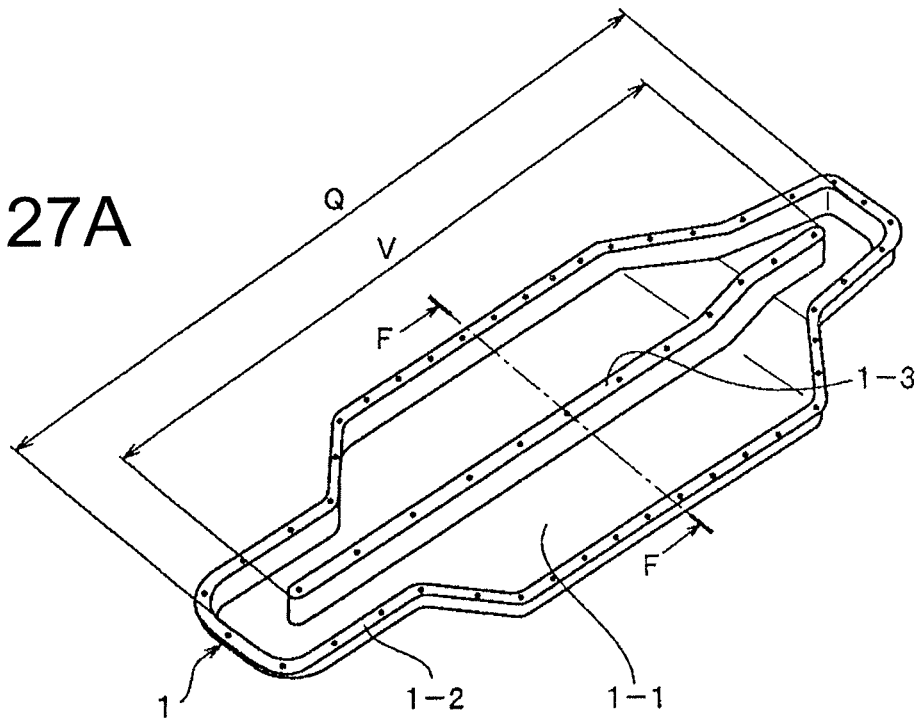
FIG. 27 (a) is a drawing in which dimensional positions are shown in FIG. 6 for indicating figures used in the simulation; (b) is a drawing in which dimensional positions are shown in F-F cross-sectional view of FIG. 27(a) for indicating figures used in the simulation.
Figure 27B:
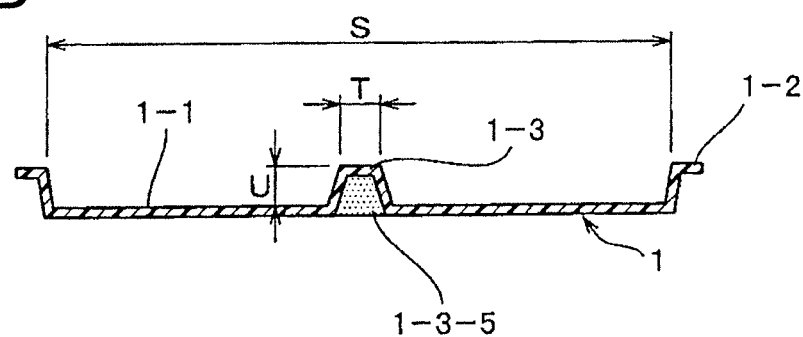

Dimension of Lower Body:

As shown in FIGS. 27 (*a*) and (*b*), a length in a front and rear direction of an inside of the flange part 1-2 in the lower body 1 (Q) and a length in a lateral direction of an inside of the flange part in the lower body (S) are set at 2,294 mm and 780 mm, respectively.

Dimension of Convex Rib Part:

In a case that a calculation is conducted regarding a vehicle body having a convex rib part 1-3, a length in a front and rear direction of the convex rib part 1-3 (V), a height from a bottom surface of the convex rib part 1-3 (U) and a side length of a top surface in a lateral direction of the convex rib part 1-3 (T) are set at 1,845 mm, 154 mm and 100 mm, respectively. Please note that the top surface having a length of 100 mm is directed to the bottom surface at a draft angle of 5 degrees. That is, its cross-section is a substantially trapezoidal shape. (As mentioned above, the thickness of the lower body 1 is constantly set at 3 mm, and along with formation of the convex rib part 1-3, a groove extending in a front and rear direction of a vehicle body is formed on a back surface of the convex rib part 1-3.)

In a case that a calculation is conducted regarding a vehicle body in which a plurality of ribs 1-3-5 of the convex rib parts crossing the groove in a front and rear direction formed on a back surface of the convex rib part 1-3 are provided, a thickness of the ribs 1-3-5 is set at 3 mm same as the thickness of the lower body 1, and as shown in FIG. 9, 14 pieces of the ribs 1-3-5 are provided perpendicular to the groove to block an entire cross-section of the groove at a same interval in a front and rear direction of the groove.

Dimension of Protrusions:

In a case that a calculation is conducted regarding a vehicle body in which a plurality of independent protrusions 1-4 are provided on a bottom surface 1-1 of the lower body 1, a shape and a position of the protrusion is set as below.

Shape of protrusions: a top surface has a radius of 30 mm and corresponds to a top surface of the flange parts 1-2. The protrusion has a substantial frustum of a cone-shape directed to the bottom surface 1-1 at a draft angle of 5 degrees.

Position of protrusions: 8 pieces of the protrusions 1-4 are placed at intersection points of two lines which are 552 mm and 1,192 mm away rearward from a front axis and parallel to the front axis and four lines which are 140 mm and 280 mm each away left and right from a center line of the vehicle body and parallel to the center line.

Bending rigidity and torsional rigidity of the vehicle body are calculated as below.

Bending rigidity: in a state that a vehicle body is supported upward at two points of a front axis part and a rear axis part, rigid bars are placed at two points which are 552 mm and 1,192 mm away rearward from a front axis so as to run across the vehicle body parallel to the axis, and 100 kgs of downward load are loaded and a deformation amount (mm) of bending of the lower body 1 is calculated.

Torsional rigidity: in a state that a front axis part is supported, torque (mN·mm) required to twist a rear axis part at an angle of one degree is calculated.

Bending rigidity and torsional rigidity are calculated under the above conditions for:

1) a vehicle body having a lower body without a convex rib part,
2) a vehicle body having a lower body with a convex rib part and without ribs,
3) a vehicle body having a lower body with a convex rib part and ribs, and
4) a vehicle body having a lower body with a convex rib part, ribs and protrusions. The results are shown in Table 1.

TABLE 1

| Structure of lower body | | 1) without convex rib part | 2) with convex rib parts and without ribs | 3) with convex rib parts and ribs | 4) with convex rib parts, ribs and protrusions |
|---|---|---|---|---|---|
| Evaluation item | value | | | | |
| Bending rigidity | Bending amount (mm) | 6.10 | 2.42 | 2.34 | 1.58 |
| Torsional rigidity | Twist torque (mN · mm) | $2.04 \times 10^9$ | $6.11 \times 10^9$ | $6.30 \times 10^9$ | $11.2 \times 10^9$ |

As clearly shown in the above calculation results, bending rigidity and torsional rigidity of the lower body 1 can be improved while its weight is reduced by providing the convex rib part 1-3 on the bottom surface 1-1 of the lower body 1, forming a groove on a back surface of the convex rib part 1-3 so as to extend in a front and rear direction of the vehicle body, providing a plurality of ribs 1-3-5 intersecting the groove and fastening the upper body 3 and the floor 3 with the lower body 1 at the flange part 1-2 and the convex rib part 1-3 in the lower body 1, which results in improved bending rigidity and torsional rigidity of the whole vehicle body.

Further, bending rigidity and torsional rigidity of the lower body 1 can be further improved by providing a plurality of independent protrusions 1-4 on a bottom surface of the lower body 1 and fastening the upper body 2 and the floor 3 with the lower body 1 at the protrusions 1-4 in addition to the flange part 1-2 and the convex rib part 1-3 in the lower body 1, which results in further improvement of the bending rigidity and the torsional rigidity of the whole vehicle body.

INDUSTRIAL APPLICABILITY

The vehicle body having a monocoque body of the present invention is particularly suitable for a micro compact electric vehicle.

EXPLANATION OF REFERENCE NUMERALS

1: lower body
1-1: bottom surface
1-2: flange part
1-3: convex rib part
   1-3-1: convex rib part not connecting the flange part
   1-3-2: convex rib part connecting the flange part
   1-3-3: convex rib part having a plate-like body
   1-3-4: boss part
   1-3-5: rib (of the convex rib part)
1-4: protrusion
1-5: side sill shape part
1-6: tip part
1-7: reinforced rib
1-8: reinforced rib
2: upper body
2-1: front upper body
2-2: rear upper body
2-3: roof
3: floor
4: fastening screw
5: nut
6: frame member
6-1: outer side frame member
6-2: inner side frame member
6-3: fastening screw
6-4: insertion nut
6-5: front upper body 2-1, rear upper body 2-2 or roof 2-3
6-6: part functioning as a rain gutter
6-7: seat belt
6-8: fall prevention member
6-9: rain guard door
7: front suspension sub frame
7-1: bracket
7-2: bracket
8: rear suspension sub frame
9, 9': ridge line part
10: opening (forming an entrance)
11: auto parts such as a battery

The invention claimed is:

1. A vehicle body having monocoque construction formed by fastening together resin parts which are an upper body as an integrally molded article obtained by molding a transparent thermoplastic resin composition, a lower body as an integrally molded article obtained by molding a thermoplastic resin composition and a floor as an integrally molded article obtained by molding a thermoplastic resin composition, wherein
the transparent thermoplastic resin composition constituting the upper body is a polycarbonate resin composition, and the thermoplastic resin composition constituting the lower body and the floor is polycarbonate resin composition or polyamide resin composition;

the lower body has a bottom surface and a flange part rising up from an entire perimeter of the bottom surface;

in a center of the bottom surface of the lower body, a convex rib part is formed continuously from a front part to a rear part of the vehicle body;

at least two spaces surrounded by the flange part, the convex rib part and the bottom surface are formed in a center part of the lower body of the vehicle to allow auto parts such as a battery to be installed;

the auto parts to be installed in the space can be fixed through fastening of the lower body and the floor;

the upper body and the floor are mounted on the lower body, and the upper body and the floor are fastened together to the flange part and the convex rib part of the lower body; and a front suspension sub-frame to which a suspension, a brake, and a steering are attached is contacted with and fixed to a large area of the bottom surface of the lower body.

2. The vehicle body according to claim 1, wherein a groove is formed on a back surface of the convex rib part, and a plurality of ribs crossing the groove are provided.

3. The vehicle body according to claim 1, wherein the upper body is divided into resin parts which are a front upper body, a rear upper body and a roof.

4. The vehicle body according to claim 1, wherein the resin parts are formed by heat press molding of a resin plate obtained from the thermoplastic resin composition.

5. The vehicle body according to claim 1, wherein the resin parts are formed by injection molding of the thermoplastic resin composition.

6. The vehicle body according to claim 1, wherein a plurality of independent protrusions are provided on the bottom surface of the lower body, and the fastening of the upper body and the floor to the lower body is performed at the protrusions in addition to the flange part and the convex rib part of the lower body.

7. The vehicle body according to claim 1, wherein the vehicle body is a vehicle body of a micro compact electric vehicle.

8. The vehicle body according to claim 1, wherein an opening forming an entrance is provided on the upper body, and a frame member is provided on an entire perimeter of the formed entrance.

9. The vehicle body according to claim 8, wherein a seat belt, a fall prevention member, a rain guard door and the like are attached to the frame member.

10. The vehicle body according to claim 8, wherein a part of the flange part which is positioned in a lower part of the entrance is extended outward, a cross-sectional shape of the extended part is made to a substantial U-shape which extends first downward and then upward, and a tip part of the extended part is connected to the frame member.

11. The vehicle body according to claim 1, wherein a vehicle body of the monocoque construction is egg-shaped.

12. The vehicle body according to claim 11, wherein two ridge line parts which are symmetrical with respect to a center line of the vehicle body in a front and rear direction and substantially parallel to the center line are provided on at least an upper surface of the upper body.

13. The vehicle body according to claim 12, wherein curvature of the ridge line part is smaller than curvature of any part of the upper body, and the curvature radius is 5mm or more.

* * * * *